United States Patent [19]

Gearhart

[11] Patent Number: 4,874,306

[45] Date of Patent: Oct. 17, 1989

[54] SIDING DIE

[75] Inventor: Kenton Gearhart, Moundridge, Kans.

[73] Assignee: American Maplan Corporation, McPherson, Kans.

[21] Appl. No.: 278,044

[22] Filed: Nov. 30, 1988

[51] Int. Cl.$^4$ ............................................. B29C 47/12
[52] U.S. Cl. .................................. 425/192 R; 425/461
[58] Field of Search ............. 425/133.5, 192 R, 376.1, 425/461, 465, 466

[56] References Cited

U.S. PATENT DOCUMENTS

| 2,587,930 | 3/1952 | Uschmann | 425/461 X |
| 2,605,532 | 8/1952 | Martin | 425/461 X |
| 4,015,925 | 4/1977 | Heilmayr | 427/376.1 X |
| 4,087,223 | 5/1978 | Angioletti et al. | 425/461 X |
| 4,563,141 | 1/1986 | Zoller | 425/461 X |
| 4,611,987 | 9/1986 | Hahn et al. | 425/192 R X |
| 4,685,879 | 8/1987 | Purstinger et al. | 425/461 X |

FOREIGN PATENT DOCUMENTS

| 207065 | 12/1986 | European Pat. Off. | 425/461 |
| 1241484 | 8/1971 | United Kingdom | 425/133.5 |

Primary Examiner—Richard L. Chiesa
Attorney, Agent, or Firm—Herbert Dubno

[57] ABSTRACT

A siding die utilizes a lip defining the orifice and provided with a pair of lip members with mating formations at their opposite ends so that the lip members are forced together when end screws bridging the lip members are tightened. The formations include inclined surfaces of respective noses which transform force applied longitudinally to the lip members to transverse sealing forces holding sealing surfaces of the lip members together on each end of the orifice.

7 Claims, 4 Drawing Sheets

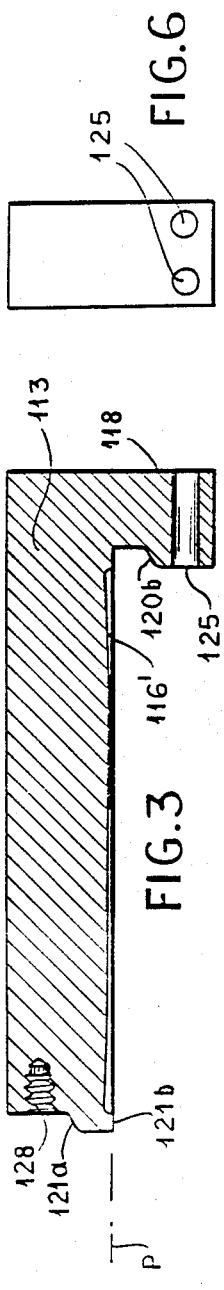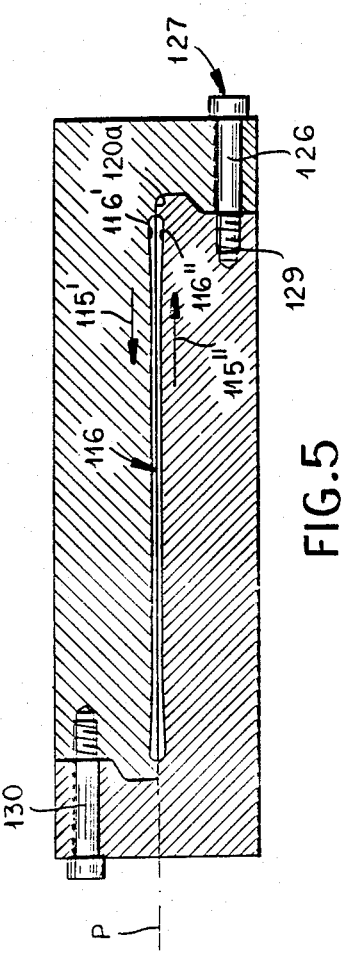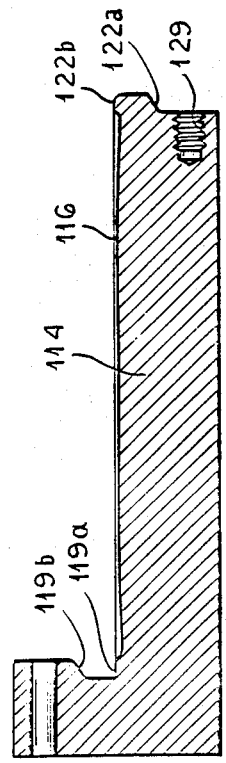

SIDING DIE

FIELD OF THE INVENTION

My present invention relates to a siding die and, more particularly to an extrusion die for the production of generally flat wide extrusions, for example, siding extrusions from polyvinylchloride or other synthetic resins.

BACKGROUND OF THE INVENTION

The extrusion of generally flat, wide panels, e.g. of polyvinylchloride or other synthetic resin material or plastics, generally utilizes an extruder upstream of the die, a die body formed with a passage leading from the extruder, and a die lip which defines the extrusion orifice and which can be mounted on the die body by screws or the like.

In U.S. Pat. No. 4,015,925, for example, the die lip is a substantially rectangular parallelepiped in which the extrusion orifice is formed and in which, moreover, the die lip is constituted from two relatively large members drawn together transversely to the orifice by cap screws located at opposite ends of the die lip and flanking the orifice perpendicular to a parting plane between the two members.

The edges of the siding extrusion which is formed can have complex contours as defined, for example, by insert members anchored in respective recesses to either side of the parting plane by respective setscrews.

In this construction, the sealing of the two lip members together is dependent upon the tightness with which the cap screws can hold the two lip members against each other.

This system has the disadvantage that considerable torque must be applied to the cap screws and that any tendency of the cap screws to relax to even the slightest may interfere with an effective seal.

The assembly of the die lip was also unduly complicated in this arrangement.

OBJECTS OF THE INVENTION

It is the principal object of the present invention to provide an improved siding die, e.g. for use in an extrusion system of the type described in the aforementioned patent or in the commonly owned copending applications Ser. No. 237,211, filed Aug. 26, 1988 and Ser. No. 254,385, filed Oct. 5, 1988.

Another object of this invention is to provide an improved siding die with a die lip which can retain its shape and orifice dimensions more effectively than earlier dies and die lips for wide-extrusion systems.

It is also an object of this invention to provide an improved extrusion die, especially for relatively wide and thin extrusions, e.g. of panels or siding, which is easier to assembly and handle than earlier dies.

SUMMARY OF THE INVENTION

These objects and others which will become apparent hereinafter are attained, in accordance with the present invention, in a siding or panel die which comprises a die body formed with a passage connected to at least one extruder and a die lip assembly mounted on this die body, communicating with the passage and defining a narrow elongated orifice of a shape corresponding in cross section to that of a panel or siding to be extruded of plastified synthetic resin, e.g. polyvinylchloride.

According to the invention, the die lip comprises a pair of lip members adapted to adjoin one another along a parting plane through the orifice and such that each of these members defines a respective side of the orifice.

The die lip is provided, according to this invention, with a unique interlock so that, upon relative displacement of the lip members in a direction parallel to the elongation direction of the lip members and generally parallel to the parting plane, mating inclined surfaces at each end of the two lip members will effect a wedging or camming action, forceably driving sealing surfaces flanking the orifice, i.e. disposed at opposite ends thereof, against one another to brace the two lip members against one another.

Advantageously, one end of each of the lip members has a nose projecting therefrom and engageable in a complementary recess of a transverse projection on the other end of the other lip member to create the wedging or camming action when a means, such as a screw, is provided parallel to the direction of relative displacement for relative shifting of the two members to generate the sealing force.

Advantageously, the inclined surface is inclined to the direction of relative displacement at about 15° to about 45°, preferably about 20° and a surface perpendicular to the sealing surface is provided between the sealing surface and the inclined surface of each nose.

The fact that each nose projects into a recess of the respective transverse projection ensures an interlock between the two lip members which is tightened by utilizing the screw or screws to generate relative movement so that a mechanical advantage is created by the inclined surface or ramp to enhance the force with which the sealing surfaces of the two lip members are urged together.

Accordingly, an extrusion die for the extrusion of a wide thin workpiece from a synthetic resin comprises:

a die body formed with a passage for an extrudable synthetic resin; and a die lip detachably mounted on the body and defining a die orifice having substantially a shape corresponding to the cross section of the workpiece, the die lip comprising:

a first elongated lip member having a contoured surface defining one side of the orifice along one side of the first lip member, a second elongated lip member having a contoured surface defining an opposite side of the orifice along one side of the second lip member juxtaposable with the one side of the first lip member, the lip members being relatively shiftable in a direction generally parallel to the longitudinal dimensions of the members, the orifice being elongated in the direction and the members being formed with mutually engageable sealing surfaces at each end of the orifice extending generally in the direction;

respective formations on opposite ends of the lip members matingly engageable upon movement of the lip members in the direction and including, at each end of the orifice, respective pairs of mating surfaces inclined to the direction and forcing the lip members against one another at the sealing surfaces upon relative movement of the lip members in the direction, and means interconnecting the lip members generally in the direction for displacing the lip members relatively in the direction.

While only a single screw need extend through the respective projection engagement with the end of each member provided with a respective nose, to draw that nose into the recess of the projection, preferably two screws are provided for greater reliability and improved force-generating power. The screws may be provided in pairs in respective planes parallel to the direction of relative movement. The inclined surface may lie at an angle of 30 to the direction of relative displacement and each nose should be received with a clearance from the bottom of the respective recess.

BRIEF DESCRIPTION OF THE DRAWING

The above and other objects, features and advantages of the present invention will become more readily apparent from the following description, reference being made to the accompanying drawing in which:

FIG. 3 is a cross sectional view of the upper half of a die lip according to another embodiment of the invention for the production of synthetic resin panels;

FIG. 4 is a cross sectional view through the lower lip member;

FIG. 5 shows the assembled die in cross section;

FIG. 6 is a side elevational view of the die lip members; and

SPECIFIC DESCRIPTION

Figure 1:
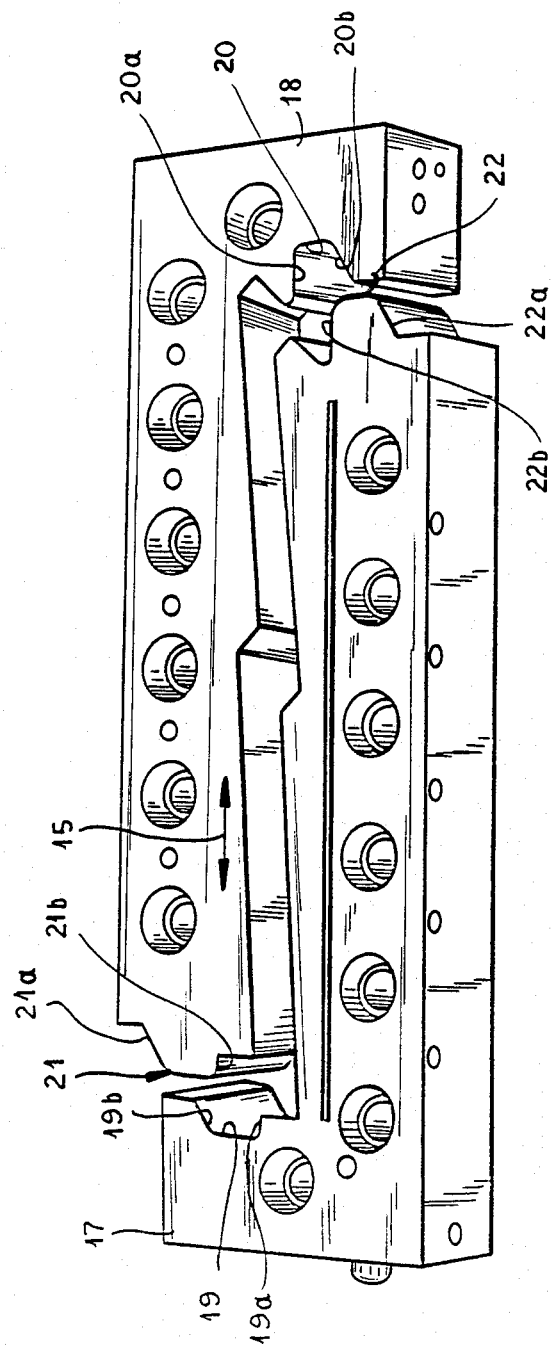
FIG. 1 is a perspective view of a die lip showing the two lip members about to be interfitted, to form a siding die according to the invention.
Figure 2:
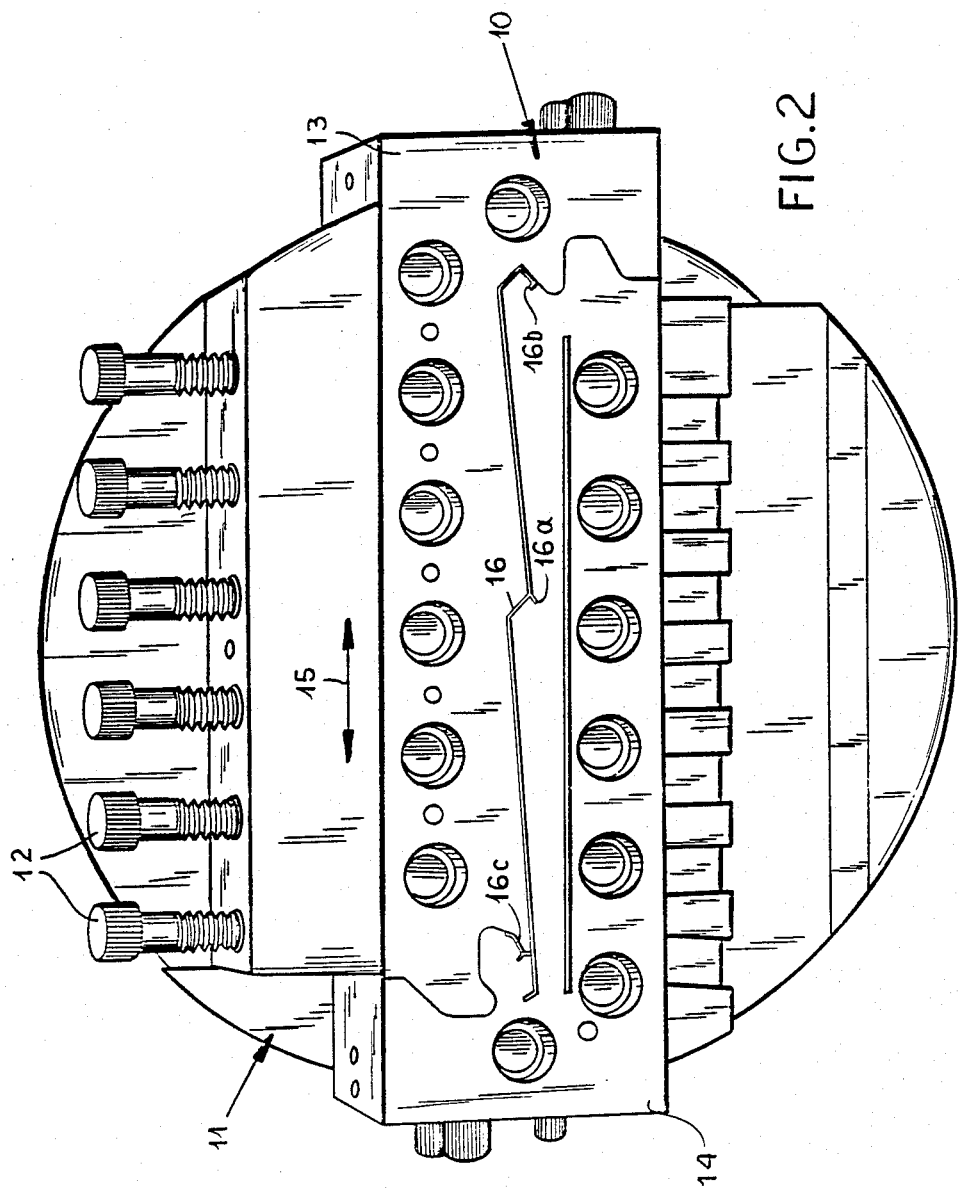
FIG. 2 is an elevational view of a siding die in accordance with the invention, provided with the die lip of FIG. 1.

Referring first to FIGS. 1 and 2, it will be apparent that a die lip 10, which can be mounted in a die body 11 by cap screws 12, for example, so that the die can extrude a wide extrusion of synthetic resin, e.g. polyvinylchloride, as described in the aforementioned patent and copending applications, has the configuration of a rectangular parallelepiped and comprises two lip members 13 and 14, respectively.

The lip members 13 and 14 are elongated in the direction of the arrow 15 and have juxtaposed sides which are contoured to define an orifice 16 which is long and thin. At various locations, cuts 16a, 16b, 16c, for example, may be made in the respective lip members to define overhanging or underhanging portions or lips of the extrusion which will emerge from the orifice. At one end, each of the lip members 13, 14 is provided with a transverse portion 17, 18 which is formed with a recess 19, 20 in which a nose 21, 22 of the other end of the other lip member is engageable.

Each nose 21, 22 has an inclined surface 21a, 22a inclined to the direction 15 outwardly and a sealing surface 21b adapted to bear against a sealing surface 19a, 20a of the respective recess 19, 20. Inclined surfaces 19b, 20b engage the inclined surfaces 21a, 22a.

By means of bolts extending parallel to the direction 15, after assembly of the two interfitting lip members shown in FIG. 1, the lip members are forced together so that the inclined surfaces 19b, 20b and 21a, 22a slidably engage and force the sealing surfaces 19a, 20a against the respective surfaces 21b, 22b. Less force is required to displace the lip members because of the presence of the wedge action provided by the inclined surfaces for a given sealing force at the sealing surfaces lying parallel to the direction 15 at opposite ends of the orifice.

The relationship just described corresponds essentially to that shown in FIGS. 3-7. Here the upper lip member 118 is provided with a pair of throughgoing bores 113 in the projection 118 extending from one end of the upper lip member. The bores 125 can accommodate the unthreaded shanks 126 of cap screws 127 threaded into the internally threaded bores 129 provided in the end of the other lip member 114. A similar pair of bores 128, however, provided for the lip member 113 at the end opposite the projection 118. Along the parting plane P, each of the lip members is formed with a broad recess 116' or 116" defining respective sides of a broad extrusion which can emerge from the orifice 116.

When the bolts 127 and 130 are tightened, the lip members are drawn in the direction of arrows 115' and 115" to tighten the interlock and cause inclined surfaces 121a and 122a to ride inwardly on the surfaces 119b and 120b and thereby force the surfaces 119a and 121b and the surfaces 120a and 122b into sealing engagement, the sealing surfaces lying in the plane P at each end of the orifice 116.

Figure 7:
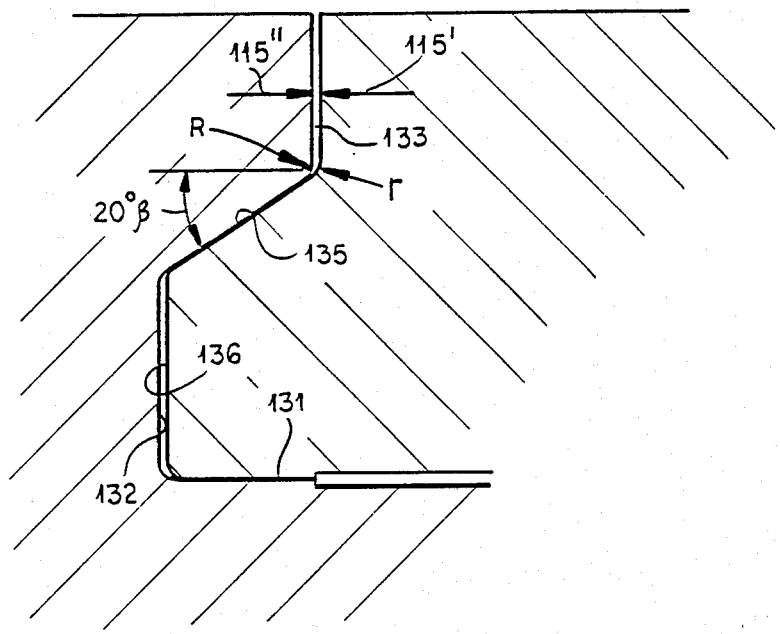
FIG. 7 is a detail view of the nose and recess structures for the die lip interlock of the invention.

This relationship has been shown in greater detail in FIG. 7 where the inclined surfaces generically represented at 135 force the sealing surfaces generically represented at 131 together because of the clearances 132 and 133 of 0.005 to 1 mm between the mating formations at the ends of the two lip members when the lip members are drawn together by the bolts as represented by the arrows 115' and 115" in FIG. 7.

The preferred angle $\beta$ between the inclined surfaces 135 and the direction of relative movement represented by the arrows 115', 115" is 20° and advantageously each nose has a surface 136 which is perpendicular to this direction and interconnects the inclined surfaces with the respective sealing surfaces. At the recess, a larger radius R is provided between adjoining surfaces while a smaller radius r is provided between adjoining surfaces of the nose.

An especially tight fit can thus be provided between the lip members by the interlock of the invention in spite of relatively small force application by the screws 126, 130.

I claim:

1. An extrusion die for the extrusion of a wide thin workpiece from a synthetic resin, comprising:
   a die body formed with a passage for an extrudable synthetic resin; and
   a die lip detachably mounted on said body and defining a die orifice having substantially a shape corresponding to the cross section of said workpiece, said die lip being of substantially rectangular parallelepipedal configuration and consisting exclusively of:
   a first elongated lip member having a contoured surface defining one side of said orifice along one side of said first lip member,
   a second elongated lip member having a contoured surface defining an opposite side of said orifice along one side of said second lip member juxtaposable with said one side of said first lip member, said lip members being relatively shiftable in a direction generally parallel to the longitudinal dimensions of said members, said orifice being elongated in said direction and said members being formed with mutually engageable sealing surfaces at each end of said orifice extending generally in said direction;
   respective formations on opposite ends of said lip members matingly engageable upon movement of said lip members in said direction and including, at each end of said orifice, respective pairs of mating surfaces inclined to said direction and forcing said lip members against one another at said sealing surfaces upon relative movement of said lip members in said direction, and means interconnecting said lip members generally in said direction for displacing said lip members relatively in said direction, said means interconnecting said lip members generally in said direction comprising a respective pair of screws traversing each of said members and threaded into the other of said members at respective ends of said members, said screws extending generally parallel to said sealing surfaces, said formations including a respective projection on a respective end of each of said lip members and formed in one piece therewith, extending transversely to said direction and mating with the other end of the other lip member, each of said other ends mating with a respective projection being formed unitarily with a nose projecting in said direction and formed with both a respective one of said inclined surfaces and a respective one of said sealing surfaces, each projection having a recess complementarily shaped to the respective nose and receiving same with a clearance of about 0.005 to 1 mm in said direction.

2. The extrusion die defined in claim 1 wherein said orifice has the configuration of the cross section of extruded siding.

3. The extrusion die defined in claim 1 wherein said inclined surface said inclined surfaces form angles of about 15° to 45° with said direction.

4. The extrusion die defined in claim 3 wherein said angle is about 20°.

5. The extrusion die defined in claim 1 wherein said inclined surface of each nose is inclined toward a plane of the respective sealing surface of the nose in a direction toward the recess receiving same.

6. The extrusion die defined in claim 1 wherein each of said noses has a further surface perpendicular to the respective sealing surface and connecting the respective sealing surface with the respective inclined surface.

7. The extrusion die defined in claim 1 wherein said lip members interfit to impart a rectangular configuration to said die lip.

* * * * *